3,474,028
PROCESS FOR THE EXTRACTION OF SULFUR FROM A MINERAL OIL-SULFUR SOLUTION
Walter Bulian, Barnstorf, Franz Fehér, Cologne, and Armin Dittmar, Barnstorf, Germany, assignors to Wintershall Aktiengesellschaft, Kassel, Germany
Filed July 10, 1967, Ser. No. 652,090
Int. Cl. C10g *19/02;* B01d *53/16*
U.S. Cl. 208—230    9 Claims

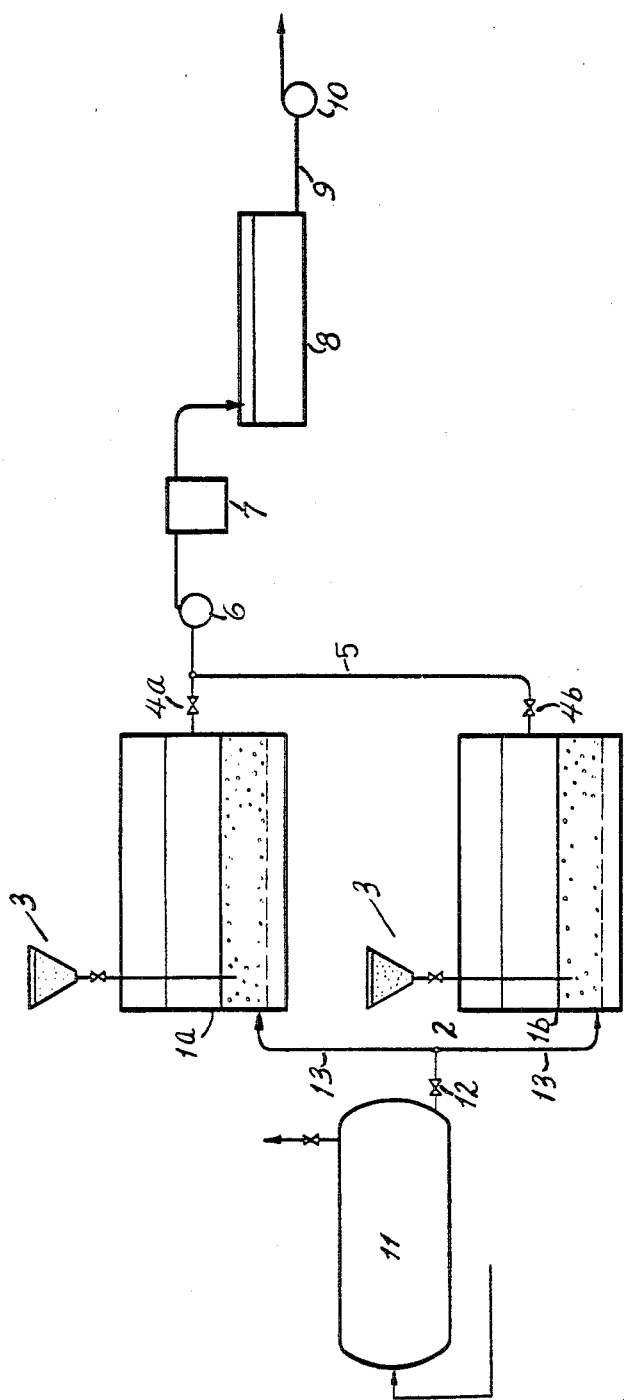

ABSTRACT OF THE DISCLOSURE

Process for extracting sulfur from a mineral oil-sulfur solution wherein the solution is contacted in a continuous process with an alkali or ammonium hydrogen sulfide solution so as to form a polysulfide solution from which the purified mineral oil is recovered. Preferably a surface active agent, particularly a conventional petroleum emulsion cracking agent is passed through the hydrogen sulfide solution in fine dispersion. The concentration of the alkali or ammonium hydrogen sulfide is between 5 and 20% and preferably 10%.

Background of the invention

It has been proposed (German published application 1,173,856) to add mineral oil to the natural gas where it enters the riser of the gas well to avoid sulfur deposits in these risers. The mineral oil may be spindle oil or some other liquid hydrocarbon. If desired there may be added a petroleum cracking agent such as one of the emulsifiers listed in the cited German application. The mineral oil is added to the gas by injection through a nozzle. During the exposure to heat particularly at the temperature between 100 and 150° a solution of the sulfur in the mineral oil takes place and at the head of the well a mineral oil-natural gas mixture passes out of the riser. The natural gas can then be separated from the mineral oil-sulfur solution outside of the riser by conventional separators, such as, deflecting plate separators. The sulfur can be caused to crystalize by a decrease of pressure and temperature and can then be separated from the oil in conventional form by sedimentation or centrifuging. The mineral oil after heat treatment, in particular in counter current against the cooled mineral oil-sulfur solution, can be fed back into the boring of the well.

Summary of the invention

It is an object of the present invention to simplify this earlier proposal and in particular to obtain a better yield of sulfur removal from the mineral oil-sulfur solution. It is another object of the invention to permit the removal of sulfur without the necessity for chilling the mineral oil, that is, to accomplish a removal by means other than purely physical or mechanical separation of the sulfur.

These objects are obtained according to the invention by contacting the mineral oil-sulfur solution with an alkali hydrogen sulfide or ammonium hydrogen sulfide solution in a continuous process. The purified mineral oil is then recovered from the thus formed polysulfide solution. Preferably, a surface active agent, and particularly a conventional oil cracking agent, is passed through the solution in finely dispersed form.

Brief description of the drawing

The drawing illustrates, in diagrammatic form, the separation of the sulfur from the mineral oil-sulfur solution and the recovery and feeding back of the purified mineral oil.

Description of the preferred embodiments

In the preferred embodiment of the invention mineral oil is first passed into the natural gas after the same has left its bed at the place where it enters the lower end of the riser of the gas well. The mineral oil may be spindle oil or some other liquid hydrocarbon, such as benzene, tetraline, heavy tar oils or chlorinated hydrocarbons such as trichloroethylene. The mineral oil is injected through a nozzle into the natural gas. The gas is then separated from the mineral oil by conventional separators such as deflection plate separators. The mineral oil-sulfur solution is thereupon contacted with an alkali or ammonium hydrogen sulfide solution of a concentration between 5 and 20%, preferably, of a concentration of about 10%. This is preferably done in a continuous process in which a conventional surface active agent particularly a conventional petroleum cracking agent, is added to the mineral oil-sulfur solution which latter is passed through the aqueous hydrogen sulfide solution in a fine dispersion, preferably, in an ascending direction. Thus, the sulfur is extracted and the more or less sulfur-free mineral oil is separated and may be fed back into the gas well, if desired, after a drying treatment. The invention permits operation of the earlier process with a considerably lower operational investment and a higher yield. The sulfur contents which initially may be between 3 and 5% can thus be reduced to residual amounts of about 0.2%.

The transfer of the elementary sulfur from the mineral oil into the aqueous alkali or ammonium hydrogen sulfide solution is considerably facilitated by the addition of surface active agents, particularly of conventional petroleum cracking agents.

The cracking agents are also known as petroleum emulsion crackers ("Erdoelemulsionsspalter") and have surface active properties. They preferably are non-ionic materials and are polyglycol ether base materials obtained from ethylene and propylene oxide. They have a molecular weight in the range between 2,000 and 10,000, preferably 4,000. They are known in the petroleum industry as emulsion crackers. The effect of these additions is to substantially reduce the interface tension between the mineral oil-sulfur solution and the aqueous alkali or ammonium hydrogen sulfide solution and thus to facilitate the penetration of the sulfur through the interface. This addition also permits to carry out the extraction at a desirable speed.

A polysulfide solution forms in the alkali or ammonium hydrogen sulfide. This polysulfide solution may for instance consist of a composition such as $Na_2S_5$ or $(NH_4)_2S_5$. As soon as the polysulfide solution has formed upon increasing concentration of sulfur, it may be separated and replaced in a continuous process by further alkali or ammonium hydrogen sulfide solution for continued extraction of sulfur. The polysulfide solution may later be used for plant protection purposes.

The rising of the mineral oil-sulfur solution in fine dispersion through the aqueous solution is possible only because of the speed of transfer of elementary sulfur from the mineral oil into the aqueous alkali or ammonium hydrogen sulfide solution. The mineral oil, such as spindle oil, is practically almost completely freed of sulfur and if necessary also of hydrogen sulfide. Traces of moisture remaining in the oil may be removed, for instance, by subsequent centrifuging. Thereafter, the mineral oil may be fed back into the gas well cycle.

The following is a specific example illustrating the invention without any intention of limitation.

A mineral (spindle) oil-sulfur mixture in the amount of 30 cm.³ with a sulfur content of about 3% is contacted with 5 cm.³ of a 20% aqueous sodium hydrogen sulfide solution. This corresponds to a concentration of 230 g. per liter. In addition 0.2% of a conventional petroleum cracker are added. The sulfur is then removed from the thus formed sodium polysulfide solution leaving only a residual amount of 0.2%.

The sulfur containing mineral oil can be passed through the polysulfide either in a continuous process or if desired in stages up to ultimate saturation, that means, up to formation of sodium pentasulfide. The added cracking agent is removed together with the polysulfide solution.

The drawing further illustrates the process of the invention.

In the drawing 11 indicates a high pressure separator into which the mineral oil-sulfur mixture enters from the gas well. From the separator the mixture passes through a valve 12 and duct 13 into the two extraction tanks 1a and 1b. In these tanks it is contacted with the sodium hydrogen-sulfide solution which is passed through the mineral oil-sulfur solution by means of a dispersing nozzle 3 which results in a fine dispersion throughout the sodium hydrogen sulfide solution. The more or less sulfur-free mineral oil then passes through valves 4a and 4b and duct 5 to a pump 6 and is pumped from there into the centrifuge 7. After removal of residual moisture contents it then passes into the storage tank of the purified oil 8. From this tank it can be fed back by means of duct 9 and high pressure pump 10 into the gas well.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalent of the claims.

What is claimed as new and desired to be protected by Letters Patent is:

1. The process of extracting sulfur from a mineral oil-sulfur solution comprising the step of contacting said solution in a continuous process with an aqueous solution selected from the group consisting of alkali hydrogen sulfide and ammonium hydrogen sulfide in the presence of a petroleum emulsion cracking agent adapted to reduce the interface tension between the mineral oil-sulfur solution and the sulfide treating agent, thereby facilitating penetration of the interface by the sulfur atoms; and recovering the purified mineral oil from the polysulfide solution thus formed.

2. The process of claim 1 wherein the mineral oil-sulfur solution is passed in a finely dispersed form and ascending direction through the said hydrogen sulfide solution.

3. The process of claim 1 wherein the said hydrogen sulfide solution is used in a concentration between 5 and 20%.

4. The process of claim 3 wherein the said hydrogen sulfide solution is used in a concentration of about 10%.

5. The process of claim 1 wherein the said petroleum emulsion cracking agent is a non-ionic polyglycol ether base compound obtained from ethylene or propylene oxide and has a molecular weight between 2,000 and 10,000.

6. The process of claim 1 wherein the formed polysulfide solution is continuously removed from the stream of mineral oil-sulfur solution and is continuously replaced by fresh amounts of said hydrogen sulfide solution.

7. The process of claim 1 wherein the mineral oil-sulfur solution is obtained by adding mineral oil to a sulfur containing natural gas flowing out of a natural bed and wherein the addition is made at the point when the gas passes into the riser of the gas well in order to inhibit the formation of sulfur deposits in the riser.

8. The process of claim 7 wherein the mineral oil after purification is fed back into the gas well.

9. The process of claim 8 wherein the mineral oil is fed back into the gas well after purification and subsequent drying.

References Cited

UNITED STATES PATENTS

| | | | |
|---|---|---|---|
| 2,471,108 | 5/1949 | Hill | 208—230 |
| 3,233,388 | 2/1966 | Karcoat et al. | 55—73 |
| 3,331,657 | 7/1967 | Peter et al. | 23—3 |
| 3,354,081 | 11/1967 | Aldridge | 208—230 |

FOREIGN PATENTS 641,051   5/1962   Canada.

REUBEN FRIEDMAN, Primary Examiner

CHARLES N. HART, Assistant Examiner

U.S. Cl. X.R.

55—73